United States Patent Office 3,297,339
Patented Jan. 10, 1967

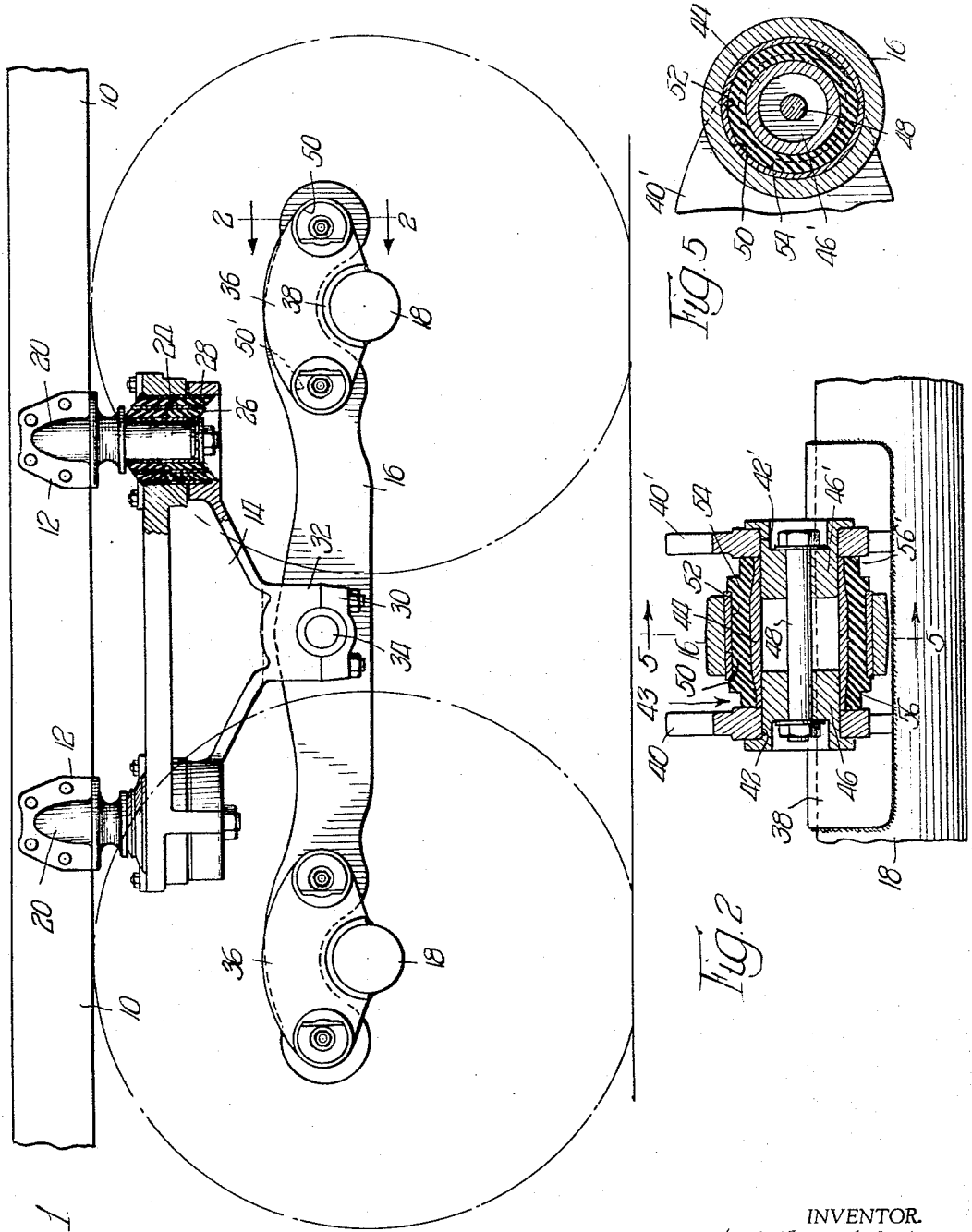
Jan. 10, 1967 — R. T. HENDRICKSON — 3,297,339
SUSPENSION SYSTEM FOR VEHICLES
Filed Oct. 9, 1964 — 3 Sheets-Sheet 1
INVENTOR.
Robert T. Hendrickson

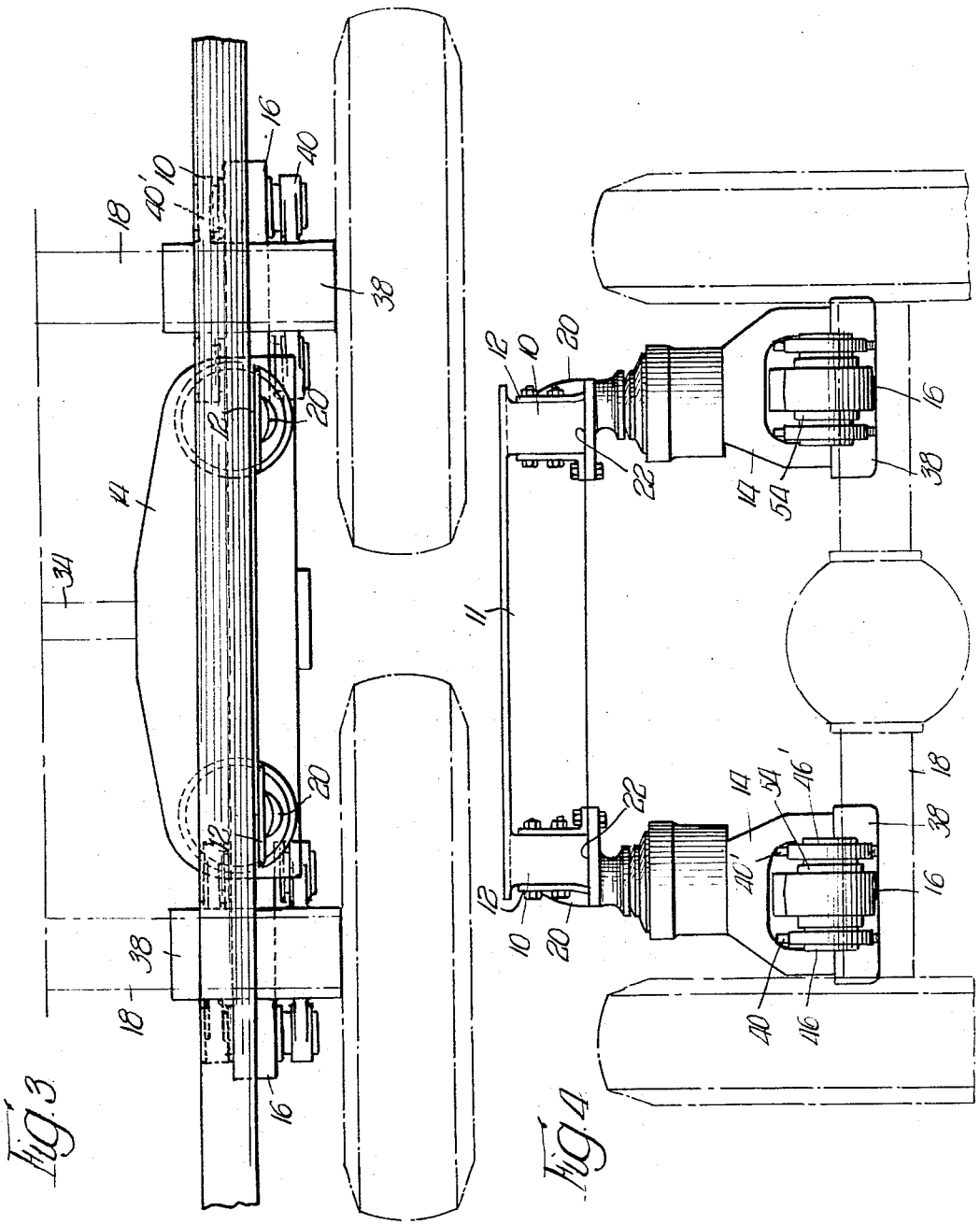

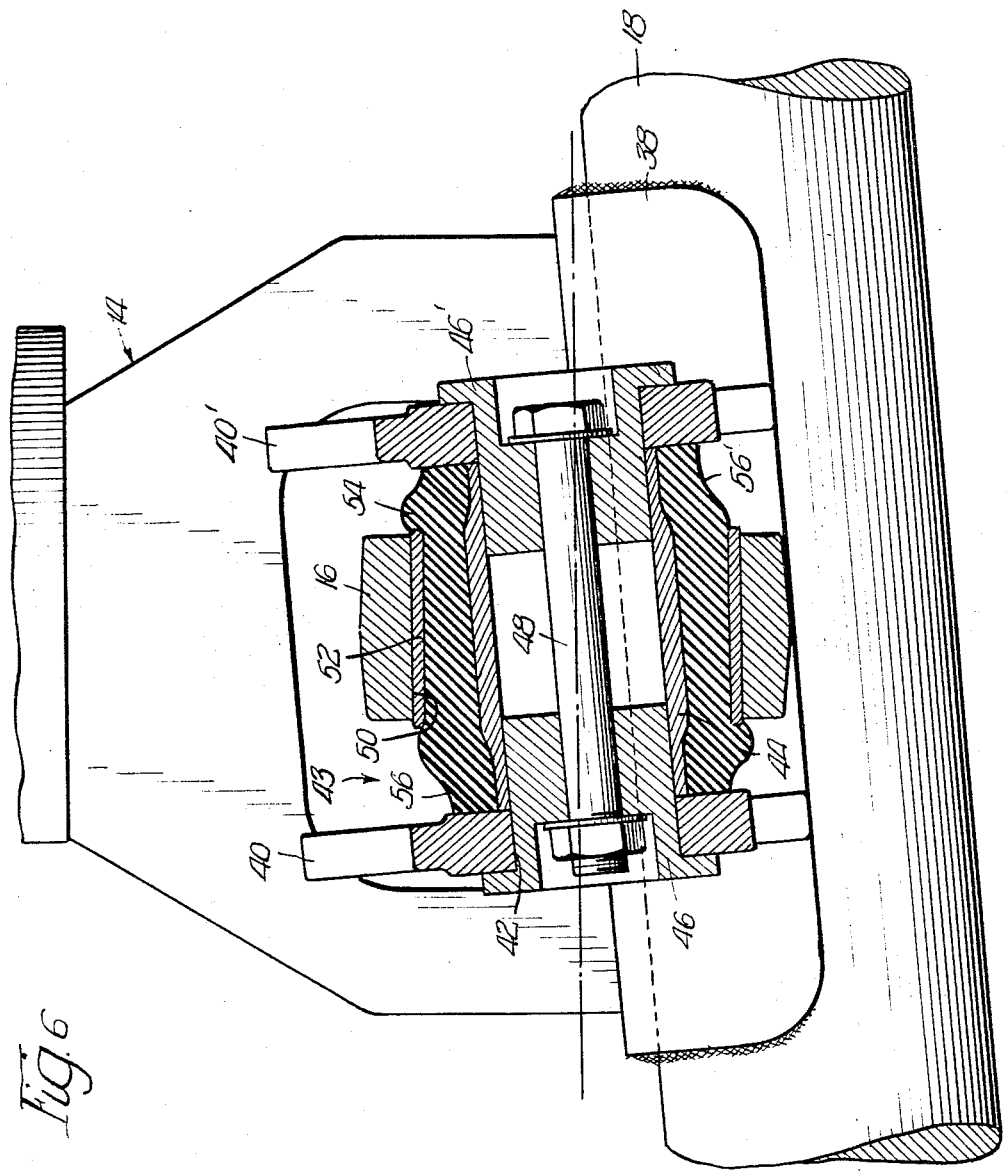

3,297,339
SUSPENSION SYSTEM FOR VEHICLES
Robert T. Hendrickson, Hinsdale, Ill., assignor to Hendrickson Mfg. Co., Lyons, Ill., a corporation of Illinois
Filed Oct. 9, 1964, Ser. No. 402,863
11 Claims. (Cl. 280—104.5)

This invention relates, generally, to innovations and improvements in suspension systems for heavy duty vehicles such as highway trucks and trailers, a large proportion of which have tandem rear axles, and the invention is more particularly concerned with improvements in the connection between the outer ends of the load distributing beam members (i.e. the equalizing beams or walking beams) of tandem axle suspension systems and the adjacent end portions of the axle housings.

Suspension systems for supporting a vehicle frame on tandem axles are well known and typical constructions are disclosed in Hendrickson Patent No. 2,689,136, dated September 14, 1954; Miller Patent No. 2,980,439, dated April 18, 1961; and Small Patent No. 3,129,016, dated April 14, 1964, and it is a general object of the present invention to provide certain improvements in a suspension of this general type.

An important object of the invention is to provide an improved tandem axle suspension system wherein each load distributing beam is connected in a novel manner at its opposite ends to the axle housings by a specially constructed bracket which is rigidly secured to the end portion of the axle housing and cradles the end of the load distributing beam which has transversely extending pin forming metal sleeve members spaced longitudinally of the load distributing beam and extending through correspondingly spaced transverse apertures in the end of the walking beam with a cushion forming member of rubber-like material interposed between each pin forming member and the load distributing beam so as to cushion the movement between the bracket and the load distributing beam and absorb transverse and vertical stresses.

It is a further object of the invention to provide an improved tandem axle suspension system for heavy duty vehicles wherein each load distributing beam is connected at its opposite ends to the axle housings by brackets which cradle the ends of the load distributing beam and which have resilient cylindrical bushings disposed on opposite sides of the axle housings and extending through spaced transverse apertures in the end of the load distributing beam whereby the system affords the following features and advantages: (1) it has substantial flexibility when traveling over a pavement or other surface having bumps or holes so that when a wheel rides over a bump or drops into a hole there is a minimum raising or lowering of the other wheels; (2) axle attaching brackets and torque rods which are normally found in most suspensions are rendered unnecessary and can be eliminated; (3) it enables the load equalizing beam to be disposed substantially level with the axle so as to provide maximum ground clearance; (4) the building of a subframe on the regular vehicle side frame to achieve the required heighth is unnecessary; and (5) it can be fabricated more economically and with considerable reduction in weight over suspensions of this type which have been employed heretofore.

These and other objects and advantages of the invention will be apparent from a consideration of the tandem axle suspension which is shown by way of illustration in the accompanying drawings wherein:

FIGURE 1 is a side elevational view, partly broken away, of one form of a tandem rear axle suspension unit for a truck or trailer with the invention incorporated therein as will be described fully hereinafter;

FIGURE 2 is a cross section taken on the line 2—2 of FIGURE 1 to an enlarged scale showing the details of one embodiment of the present invention;

FIGURE 3 is a fragmentary top plan view showing one half of the tandem axle unit;

FIGURE 4 is a rear elevational view showing the unit of FIGURE 1;

FIGURE 5 is a section taken on the line 5—5 of FIGURE 2; and

FIGURE 6 is a cross section similar to FIGURE 2, to a greatly enlarged scale, and with the axle in the position it will assume when the wheel on the end thereof drops into a hole in the supporting surface.

Referring to FIGURES 1, 3 and 4 of the drawings there is illustrated therein, for better understanding of my invention, a complete tandem axle suspension unit for supporting a vehicle frame of typical construction, which may include a pair of longitudinal channel beams 10—10 and an end connecting cross beam 11, on conventional tandem axles 18—18. A pair of bracket fixtures 12—12 are attached in longitudinally spaced relation to opposite side beams 10—10 and depend therefrom for resilient connection with opposite ends of a typical saddle member 14 which is pivotally mounted and supported on the middle of a load distributing beam or walking beam 16, the latter extending between the ends of tandem axles 18—18 and being connected to the axle housings in a special manner which constitutes the principal feature of this invention.

In the form of the suspension unit in which the invention is illustrated suspension brackets 12—12 are interposed between the ends of the saddle 14 and the chassis side frame member 10 which include a vertical portion 20 which is disposed against the outside vertical portion of the channel beam 10 and a flat disc portion 22 at the lower end thereof disposed partially up against the bottom horizontal portion of the channel beam 10. Each bracket fixture 12 is positioned over the end of the saddle member 14 and has a depending pin 24 which is received in a socket forming bore 26 in the end of the saddle member 14 and is connected thereto by means of a resilient suspension unit 28 of a type which is designed to absorb the two principal types of load or stress, that is, vertical stresses due to the weight of the frame and the load and horizontal stresses due to starting, turning and braking operations. A suitable suspension unit in which the invention may be incorporated and which is characterized by a plurality of concentrically arranged sleeve members of rigid and resilient material is particularly described in Miller Patent No. 2,980,439 to which reference may be had for details thereof. Instead of using the particular arrangement shown in FIGURES 1, 3 and 4 for spring or resiliently mounting the frame of the equalizing beams 16, various arrangements may be used, such as conventional leaf springs or air cushion units. Therefore it is not intended to limit the invention to the particular suspension arrangement with which it is illustrated.

Each of the saddles 14 in the form shown has a removable bottom bearing half 30 which mates with an upper bearing half 32 formed as an integral part of the saddle. The two mating bearing halves 30 and 32 provide journal bearings on opposite sides of each saddle 14 by which the saddle is pivotally mounted on the opposite ends of a shaft 34 passing through the middle of each of the load distributing beams 16 and extending across the vehicle so that one shaft 34 serves both load distributing beams 16. The saddle 14 and the load distributing beam 16 on each side of the vehicle frame extend beneath the lower face of the frame side channel 10 and the load distributing beam 16 is connected at each end to an axle housing 18 by a bracket formation 36 having special features of construction and functioning as will now be described.

As indicated above, this invention features the special connection between the end of the load distributing beam 16 and the axle housing 18 which comprises the bracket assembly 36 (FIGURES 1, 2, 5 and 6). Each connecting bracket assembly 36 comprises a base member in the form of approximately half of a tubular section 38, which is adapted to fit over the top of the axle housing 18 and to be welded or otherwise rigidly secured thereto, and two laterally spaced plate sections 40 and 40' which are disposed in spaced parallel relation and extend upwardly from the bottom base member 38 and which are spaced so that their inside faces are separated by a greater distance than the width of the end portion of the load distributing beam 16. The upstanding plates 40 and 40' are provided with transversely aligned pairs of bores or openings 42 and 42' at opposite ends thereof and a cylindrical bushing 43 extends between and connects the openings of each pair thereof. The bushing 43 comprises an inner metal sleeve 44 which receives the inner ends of flanged plug members 46 and 46', the latter being connected when inserted in the bores 42 and 42' by a bolt 48 and maintaining the bushing 43 in position. The bushing 43 is received in bores 50 and 50' in the ends of the load distributing beam 16 and each bushing has an outer metal sleeve 52 and a cushion forming cylindrical sleeve 54 of rubber or other rubber-like material interposed between the outer sleeve 52 and the inner sleeve 44 and bonded thereto in a known manner. Each of the cushion forming sleeves 54 constitutes a resilient connection between the bracket assembly 36 and the load distributing beam 16 and each of these sleeve members 54 has a portion at each end thereof which is of a reduced exterior diameter leaving in effect an exterior groove 56 and 56' and permitting greater flexibility so as to more readily absorb transverse stresses as clearly illustrated in FIGURE 6 where the bushing 43 is distorted by twisting movement of the axle 18 due to the associated wheel dropping into a depression in the pavement or other supporting surface on which the vehicle is traveling.

The connecting bracket assemblies 36 have special advantages in that they enable each load distributing beam 16 to be disposed substantially beneath a side frame channel with an interposed saddle 14 having a resilient connection at opposite ends to the frame channel. They also enable the load distributing beam 16 to be mounted so that it is substantially on a level with the two tandem axles 18 and no subframe is required to mount the assembly on the vehicle side frame. The axle housings are rigidly connected to the ends of the load distributing beams by the bracket assemblies 36 and a two point connection with the load distributing beam is provided with the connecting points on opposite sides of the axle housing and above the same while the resilient sleeve or bushing member 54 is interposed at each of the points between the bracket and the load distributing beam. Any tendency of the axle housing to rotate, due to braking or forward acceleration, is cancelled out by the two point connections on opposite sides of the axle thereby eliminating the need for torque rods. The tubular bushing members 54 with their ends cut back absorb lateral stresses so that when one of the wheels drops into a hole which in effect moves it towards the longitudinal center of the unit there is no lifting tendency transmitted to the wheels on the opposite side of the vehicle.

While particular materials and specific details of construction have been referred to in describing the illustrated form of the invention, it will be understood that other materials and equivalent structural arrangements may be resorted to without departing from the spirit and scope of the invention as defined in the appended claims.

I claim:

1. In a tandem axle suspension system for a vehicle frame including a load distributing beam extending beneath each side of the vehicle frame, and a saddle member which has a pivotal connection with the midpoint of the load distributing beam and resilient connections at longitudinally spaced points with the vehicle frame, the improvement which comprises a connecting bracket at each end of the load distributing beam, said bracket cradling the end portion of the load distributing beam, said bracket having transversely extending bushings which are spaced in the direction longitudinally of the load distributing beam and which extend through correspondingly spaced transverse apertures in the end portion of said load distributing beam, said bracket being secured to the axle housing with the bushings on opposite sides thereof and said load distributing beam being disposed substantially level with the axles, said bushings each including a cylindrical sleeve member extending between the bracket and the load distributing beam which is formed of resilient material so as to cushion the movement between the bracket and the load distributing beam and absorb transverse and vertical stresses.

2. In a tandem axle suspension system for a vehicle frame including a load distributing beam extending beneath each side of the vehicle frame, the improvement which comprises a connecting bracket at each end of each load distributing beam which is rigidly secured to the end portion of an axle housing, said connecting bracket having a top portion cradling the end portion of the load distributing beam and having a pair of spaced transversely extending bushings which extend through correspondingly spaced transverse apertures in said load distributing beam, the bushings of each pair thereof being disposed in parallel relation on opposite sides of the associated axle and the load distributing beam being substantially level with the axles, each of said bushings including a sleeve of rubber-like material whereby to cushion the movement between the axle housing and the load distributing beam and to absorb transverse and vertical stresses.

3. A suspension system for a vehicle frame including a pair of tandem axles and a load distributing beam extending beneath each side of the vehicle frame and having a resilient connection at longitudinally spaced points with said vehicle frame, a connecting bracket at each end of each load distributing beam which is rigidly secured to the end portion of an axle housing, each said connecting bracket being of upwardly opening U-shaped cross section and positioned to cradle the end portion of the load distributing beam, connecting members secured in said bracket on opposite sides of the associated axle housing and extending through correspondingly spaced transverse apertures in the end portion of said load distributing beam, which connecting members are in the form of bushings extending between the side members of the bracket and including telescoping sleeve members of a length exceeding the width of the end portion of the load distributing beam, one of said sleeve members being formed of resilient material and having marginal portions at opposite ends cut away so as to reduce the thickness and said cut away portions being exposed between the bracket and the load distributing beam whereby to cushion the movement between the bracket and the load distributing beam and absorb transverse and vertical stresses.

4. A tandem axle suspension for a vehicle having a longitudinally extending frame structure including side beam members, which suspension includes housings enclosing the tandem axles, a load distributing beam disposed beneath each of the frame side beam members, cushion forming means extending between each of the frame side beam members and the load distributing beam and pivotally connecting the load distributing beam to the side beam members, a connecting bracket secured on the end portion of each axle housing and having resilient connections with an end portion of the adjacent load distributing beam on opposite sides of said axle housing, said resilient connections each including a transversely extending bushing secured on said connecting bracket and extending through an aperture adjacent the end of said load distributing beam and a cylindrical sleeve member of rubber-like material disposed in said aperture so as to form a cushion between said bracket and said load distributing beam.

5. In a tandem axle suspension system for a vehicle frame including a load distributing beam extending beneath each side of the vehicle frame, the improvement which comprises a bracket assembly connecting the end of each load distributing beam and a tandem axle, said bracket assembly including a U-shaped bracket member fixed on the top of the axle housing and having upstanding transversely spaced side plates disposed in facing relation with the side walls of the end portion of the adjacent walking beam on opposite sides of said axle housing, a pair of bushings also spaced on opposite sides of the axle housing and supported between said upstanding side plates, each of said bushings including an inner cylindrical member of rigid metal and a length corresponding to the distance between said upstanding side plates, an outer cylindrical member of rigid metal and a length substantially less than said inner cylindrical member, a cushion forming cylindrical member of rubber-like material interposed between said inner and outer cylindrical members and having the same length as said inner cylindrical member, and said bushings seated in transversely extending apertures in the end of said load distributing beam.

6. In a tandem axle suspension for a vehicle frame including tandem axles, and a load distributing beam extending beneath each side of the vehicle frame, the improvement which comprises a connecting bracket rigidly secured on the end portion of each axle housing and having a resilient connection with an end portion of the adjacent load distributing beam on opposite sides of said axle housing, each said resilient connection including a resilient bushing secured on said connecting bracket and extending through an aperture adjacent the end of said load distributing beam which bushing is constructed to absorb transverse and vertical stresses resulting from twisting action of the axle housing.

7. In a tandem axle suspension system for a vehicle frame which includes a load distributing beam extending beneath each side of the vehicle frame and substantially level with the axles, the improvement which comprises means for connecting the end of the load distributing beam to the end portion of the axle housing including a bracket having transversely extending bushing assemblies supported between spaced side plates which bushing assemblies are spaced in the direction longitudinally of the vehicle frame and which extend through correspondingly spaced transverse apertures in said load distributing beam, said bracket being connected to said axle housing at a point between said bushing assemblies, each of said bushing assemblies having an outer sleeve disposed in the load distributing beam aperture, a rigid cylindrical inner sleeve secured in the bracket and a cylindrical member of resilient, rubber-like material interposed between the inner and outer rigid sleeves so as to permit cushioned movement between the bracket and the load distributing beam and absorb transverse and vertical stresses resulting from twisting movement of the axle housing.

8. In a tandem axle suspension system for a vehicle frame including a load distributing beam extending beneath which comprises a connecting bracket at each end of each load distributing beam which is rigidly secured to the end portion of an axle housing, said connecting bracket having a portion cradling a portion of the load distributing beam and having a pair of spaced transversely extending connecting bushings which extend through correspondingly spaced transverse apertures in said load distributing beam which are spaced longitudinally of said beam and which are disposed on opposite sides of the associated axle housing, and each of which includes a cylindrical sleeve of rubber-like material so as to cushion the movement between the axle housing and the load distributing beam and to absorb transverse and vertical stresses resulting from twisting movement of the associated axle.

9. A tandem axle suspension system for a vehicle frame which suspension system comprises a pair of tandem axles each having a housing, a load distributing beam extending beneath each side of the vehicle frame, a connecting bracket at each end of each load distributing beam which is rigidly secured to the end portion of an axle housing, a saddle member disposed beneath the vehicle frame which has a pivotal connection with the midpoint of the load distributing beam and a connection at longitudinally spaced points with said vehicle frame, each said connecting bracket being disposed at the end portion of the load distributing beam and connected thereto at points which are longitudinally spaced and on opposite sides of the associated axle housing, said connecting members being in the form of bushings at said points which bushings extend through correspondingly spaced, transverse apertures in said load distributing beam, each bushing including inner and outer rigid sleeve members and a resilient sleeve member interposed between said rigid sleeve members, said resilient sleeve member having marginal portions at opposite ends exposed between said bracket and said load distributing beam and of reduced section whereby to cushion the movement between the bracket and the load distributing beam and absorb transverse and vertical stresses.

10. A tandem axle suspension for a vehicle having a frame structure including longitudinally extending side members, which suspension comprises housings enclosing the tandem axles, a load distributing beam extending along each of the vehicle frame side members, cushion forming means including longitudinally spaced members connecting each load distributing beam and the adjacent vehicle frame side member, said cushion forming means having a pivotal connection with the midpoint of said load distributing beam, a connecting bracket fixed on the end portion of each axle housing and having spaced resilient connections with an end portion of the adjacent load distributing beam on opposite sides of said axle housing, each said resilient connection including a rigid sleeve member secured on said connecting bracket and extending through an aperture adjacent the end of said load distributing beam and a resilient stress absorbing sleeve forming member seated in said aperture and telescoped over said rigid sleeve member which resilient sleeve member has a larger dimension in the direction transversely of the vehicle than the corresponding dimension of the end portion of each load distributing beam whereby the resilient sleeve member has exposed end portions extending between said connecting bracket and said load distributing beam on opposite sides of said load distributing beam.

11. In a tandem axle suspension system for a vehicle which includes a load distributing beam extending beneath each side of the vehicle frame, the improvement which comprises a connecting bracket secured at each end of each load distributing beam to the end portion of an axle housing, said connecting bracket having a top portion cradling the end portion of the load distributing beam and having a pair of spaced transverse bushings which are seated in correspondingly spaced, transversely extending apertures in said load distributing beam, each of said bushings including a sleeve of resilient material which cushions the movement between the axle housing and the load distributing beam whereby a two-point connection between the load distributing beam and the axle housing is provided with the connecting points on opposite sides of the axle housing so that any tendency of the axle housing to rotate due to braking or forward acceleration is cancelled out by the two-point connections and the need for torque rods is eliminated.

References Cited by the Examiner

UNITED STATES PATENTS

| | | | |
|---|---|---|---|
| 2,209,528 | 7/1940 | Larison | 280—81 |
| 2,635,897 | 4/1953 | Kendall | 280—104.5 |
| 2,914,349 | 11/1959 | Small | 287—85 |

FOREIGN PATENTS 397,957　9/1933　Great Britain.

BENJAMIN HERSH, *Primary Examiner.*

P. GOODMAN, *Assistant Examiner.*

UNITED STATES PATENT OFFICE
CERTIFICATE OF CORRECTION

Patent No. 3,297,339                                   January 10, 1967

Robert T. Hendrickson

It is hereby certified that error appears in the above numbered patent requiring correction and that the said Letters Patent should read as corrected below.

Column 1, line 24, after "suspension" insert -- system --; column 6, line 4, after "be-" insert -- neath each side of the vehicle frame, the improvement --.

Signed and sealed this 17th day of October 1967.

(SEAL)
Attest:

Edward M. Fletcher, Jr.                               EDWARD J. BRENNER
Attesting Officer                                         Commissioner of Patents